United States Patent
Johnson et al.

(10) Patent No.: US 12,399,100 B2
(45) Date of Patent: Aug. 26, 2025

(54) SYSTEMS, DEVICES, AND METHODS FOR QUALITY CONTROL OF CELL PRODUCTION USING PREDICTIVE TAGGING

(71) Applicant: ALLEN INSTITUTE, Seattle, WA (US)

(72) Inventors: Gregory Johnson, Seattle, WA (US); Chawin Ounkomol, Seattle, WA (US); Forrest Collman, Seattle, WA (US); Sharmishtaa Seshamani, Seattle, WA (US); Michael Kranda, Seattle, WA (US)

(73) Assignee: ALLEN INSTITUTE, Seattle, WA (US)

( * ) Notice: Subject to any disclaimer, the term of this patent is extended or adjusted under 35 U.S.C. 154(b) by 178 days.

(21) Appl. No.: 18/041,086

(22) PCT Filed: Aug. 11, 2021

(86) PCT No.: PCT/US2021/045561
§ 371 (c)(1),
(2) Date: Feb. 9, 2023

(87) PCT Pub. No.: WO2022/035973
PCT Pub. Date: Feb. 17, 2022

(65) Prior Publication Data
US 2023/0266221 A1    Aug. 24, 2023

Related U.S. Application Data (60) Provisional application No. 63/064,472, filed on Aug. 12, 2020.

(51) Int. Cl.
*G01N 15/0227* (2024.01)
*G01N 15/1429* (2024.01)
(Continued)

(52) U.S. Cl.
CPC ..... *G01N 15/0227* (2013.01); *G01N 15/1429* (2013.01); *G01N 15/1433* (2024.01); *G01N 2015/1445* (2013.01)

(58) Field of Classification Search
None
See application file for complete search history.

(56) References Cited

U.S. PATENT DOCUMENTS 7,756,309 B2    7/2010    Gholap et al.
7,817,841 B2    10/2010    Padfield et al.
(Continued)

FOREIGN PATENT DOCUMENTS

EP    2921990 A2    9/2015
WO    2010056409 A1    5/2010
(Continued)

OTHER PUBLICATIONS

International Search Report and Written Opinion of the International Searching Authority dated Oct. 19, 2018, PCT Appl. No. PCT/US18/45840.
(Continued)

*Primary Examiner* — Lennin R Rodriguezgonzalez
(74) *Attorney, Agent, or Firm* — MEDLER FERRO WOODHOUSE & MILLS PLLC (57) ABSTRACT

The present invention provides various methods for easily assessing cell quality of a cell production process, suitably using non-invasive visual methods and neural networks for generating predictive fluorescence images of cells to assess quality attributes. Also provided are systems and methods for carrying out such processes.

20 Claims, 4 Drawing Sheets

(51) Int. Cl.
*G01N 15/1433* (2024.01)
*G01N 15/1434* (2024.01)

(56) References Cited

U.S. PATENT DOCUMENTS

| | | | |
|---|---|---|---|
| 8,379,962 | B2 | 2/2013 | Hoyt et al. |
| 8,705,833 | B2 | 4/2014 | Yukako et al. |
| 8,725,237 | B2 | 5/2014 | Bryant-Greenwood et al. |
| 9,002,077 | B2 | 4/2015 | Hoyt et al. |
| 9,008,378 | B2 | 4/2015 | Micheva et al. |
| 9,104,903 | B2 | 8/2015 | Callahan et al. |
| 9,619,881 | B2 | 4/2017 | Maddah et al. |
| 9,625,387 | B2 | 4/2017 | Demos et al. |
| 9,770,172 | B2 | 9/2017 | Sturm |
| 9,786,050 | B2 | 10/2017 | Bhargava |
| 9,799,098 | B2 | 10/2017 | Seung et al. |
| 9,971,966 | B2 | 5/2018 | Nelson et al. |
| 10,692,001 | B2 | 6/2020 | Nelson et al. |
| 10,723,999 | B2 | 7/2020 | Perrard et al. |
| 10,935,773 | B2 | 3/2021 | Johnson et al. |
| 11,306,341 | B2 | 4/2022 | Hwang et al. |
| 2015/0087240 | A1 | 3/2015 | Loewke et al. |
| 2016/0177361 | A1 | 6/2016 | Hwang et al. |
| 2017/0029768 | A1 | 2/2017 | Perrard et al. |
| 2019/0384047 | A1 | 12/2019 | Johnson et al. |
| 2020/0199555 | A1 | 6/2020 | Zhang |

FOREIGN PATENT DOCUMENTS

| | | |
|---|---|---|
| WO | 2017146813 A1 | 8/2017 |
| WO | 2022/026532 A1 | 2/2022 |

OTHER PUBLICATIONS

International Search Report & Written Opinion, International Application No. PCT/US2021/045561, Mailing Date: Nov. 9, 2021, 10 pages.

Li et al., "Deep Learning Based Imaging Data Completion for Improved Brain Disease Diagnosis," Med. Image Comput. Assist Interv. 17(0 3): p. 305-312 (2014).

SYSTEMS, DEVICES, AND METHODS FOR QUALITY CONTROL OF CELL PRODUCTION USING PREDICTIVE TAGGING

FIELD OF THE INVENTION

The present invention provides various methods for assessing cell quality of a cell production process, suitably using non-invasive visual methods and neural networks for generating predicted fluorescence images of cells to asses quality attributes. Also provided are systems and methods for carrying out such assessments.

BACKGROUND

The advance of cellular-based therapies has increased dramatically in recent years, leading to the development of various methods for the rapid production of large quantities of various cells and cellular products. With such developments comes the need for methods to quickly and easily assess the quality of the cells that are being produced. This includes not only the quality of the cells for use in therapies, but the quality of any of the biological products that may be produced by the cells. In addition, there is a need for being able to assess cell quality without disturbing the cell production process, including for automated cell production processes.

The present invention fulfills these needs by providing methods, systems and devices for assessing cell quality during production processes through the use of machine learning image processing, including predictive fluorescence imaging.

SUMMARY OF THE INVENTION

In embodiments, provided herein is a method for assessing cell quality during a cellular production process, the method comprising: obtaining a 3D microscopy image that is a transmitted light image of one or more structures of a cell during the cellular production process, wherein no fluorescence labeling is included in the 3D microscopy image; generating, with a neural network, a predicted 3D fluorescence image that includes predicted fluorescence labeling of the one or more structures of the cell; identifying a quality attribute of the cell based on the predicted 3D fluorescence image; and assessing the quality attribute against a comparison set for the cell as a measure of cell quality.

In additional embodiments, provided herein is a method for assessing cell quality during a cellular production process, the method comprising: obtaining a 3D microscopy image that is a transmitted light image of one or more structures of a cell in real-time during the cellular production process, wherein no fluorescence labeling is included in the 3D microscopy image, and wherein the cell is not removed from the cellular production process during the obtaining of the 3D microscopy image; generating, with a neural network, a predicted 3D fluorescence image that includes predicted fluorescence labeling of the one or more structures of the cell; identifying a quality attribute of the cell based on the predicted 3D fluorescence images, wherein the quality attribute is one or more of an average or median cell size, a cell viability, a cell confluency, a cell count, a cell morphology, a cell cycle phase, a cell growth rate, a cell integrity, a membrane integrity, an organelle integrity, a mitochondrial activation level, the presence or absence of a mycoplasmal, bacterial, fungal or viral contaminant, a fertilization event, a differentiation state, a batch to batch variability, or a quantity of transgenic protein produced; and assessing the quality attribute against a comparison set for the cell as a measure of cell quality.

In further embodiments, provided herein is a system for assessing cell quality during a cellular production process, comprising: a bioreactor for carrying out the cellular production process; a microscope configured to obtain a 3D microscopy, transmitted light image of a structure of a cell in the bioreactor; a communication interface configured to receive the 3D microscopy, transmitted light image; a processor; and a non-transitory computer-readable medium communicatively coupled to the communication interface and to the processor, and storing computer-executable instructions that, when executed by the processor, causes the processor to: generate, with a neural network, a predicted 3D fluorescence image that includes predicted fluorescence labeling of the one or more structures of the cell; identify a quality attribute of the cell based on the predicted 3D fluorescence image; and assess the quality attribute against a comparison set for the cell as a measure of cell quality.

DETAILED DESCRIPTION

It should be appreciated that the particular implementations shown and described herein are examples and are not intended to otherwise limit the scope of the application in any way.

The published patents, patent applications, websites, company names, and scientific literature referred to herein are hereby incorporated by reference in their entirety to the same extent as if each was specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the method/device being employed to determine the value. Typically, the term is meant to encompass approximately or less than 1%, 2%, 3%, 4%, 5%, 6%, 7%, 8%, 9%, 10%, 11%, 12%, 13%, 14%, 15%, 16%, 17%, 18%, 19% or 20% variability depending on the situation.

The use of the term "or" in the claims is used to mean "and/or" unless explicitly indicated to refer only to alternatives or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited, elements or method steps.

In embodiments, provided herein is a method for assessing cell quality during a cellular production process.

As used herein, the term "cell quality" or the "quality control of a cell" refers to the measurement and/or determination of one or more quality attributes of a cell such that a quantitative and/or qualitative determination can be made about whether or not a cell is healthy and capable of expansion or differentiation and able to function as desired in a therapeutic setting or research setting. A "quality attribute" of a cell refers to one or more characteristics of a cell that provides the information for the quantitative and/or qualitative determination of cell quality, and includes, but is not limited to, one or more of an average or median cell size, a cell viability, a cell confluency, a cell count, a cell morphology, a cell cycle phase, a cell growth rate, a cell integrity, a membrane integrity, an organelle integrity, a mitochondrial activation level, the presence or absence of a mycoplasmal, bacterial, fungal or viral contaminant, a fertilization event, a differentiation state, a batch to batch variability, or a quantity of transgenic protein produced. The presence or absence of a cell surface protein, including a desired cell surface protein, can also be a quality attribute as described throughout.

As used herein, a "cellular production process" refers to a set of steps for the generation of a cell culture or cell line, and suitably a cell culture or cell line for use in a cell therapy. Exemplary steps in a cellular production process include one or more of cell separation, genetic manipulation (e.g., transduction or transfection), proliferation or expansion, in vitro fertilization, washing, concentration, and cell harvesting. In exemplary embodiments, the cellular production process is an automated process, in that the process requires little to no outside involvement from an operator, and instead is monitored by a microprocessing system (e.g., a computer), which notes changes in the process or specific timepoints in the process, and modifies one or more inputs or characteristics of the process accordingly. For example, the automated process can change a pH, a media concentration, a temperature, a gas concentration or flow rate, a stirring or mixing speed or agitation condition, etc. In other embodiments, the cellular production process is a manual, or substantially manual, production process, such as the introduction of an egg(s) and sperm during in vitro fertilization (suitably human fertilization).

A cellular production process suitably takes place in a bioreactor or a fermenter. For example as shown illustratively in FIG. 1, a bioreactor 101 suitably includes a tank or reservoir for holding a cell solution during processing and proliferation, as well as various inlets for introduction of gasses and nutrients, as well as outlets for removal of waste, testing samples, and a final desired product.

The methods, systems and devices described herein can be utilized in connection with any suitable bioreactor (also called reactor herein) including but not limited to stirred tank, airlift, fiber, microfiber, hollow fiber, ceramic matrix, fluidized bed, fixed bed, and/or spouted bed bioreactors. As used herein, "bioreactor" can include a fermenter or fermentation unit, or any other reaction vessel, chamber or incubator and the terms "bioreactor" and "reactor" are used interchangeably with "fermenter." The term fermenter or fermentation refers to both microbial and mammalian cultures. For example, in some aspects, an example bioreactor unit can perform one or more, or all, of the following: feeding of nutrients and/or carbon sources, injection of suitable gas (e.g., oxygen), inlet and outlet flow of fermentation or cell culture medium, separation of gas and liquid phases, maintenance of temperature, maintenance of oxygen and $CO_2$ levels, maintenance of pH level, agitation (e.g., stirring), and/or cleaning/sterilizing. Example reactor units, such as a fermentation unit, may contain multiple reactors within the unit, for example the unit can have 1, 2, 3, 4, 5, 10, 15, 20, 25, 30, 35, 40, 45, 50, 60, 70, 80, 90, or 100, or more bioreactors in each unit and/or a facility may contain multiple units having a single or multiple reactors within the facility. In various embodiments, the bioreactor can be suitable for batch, semi fed-batch, fed-batch, perfusion, and/or a continuous fermentation processes. Any suitable reactor diameter can be used. In embodiments, the bioreactor can have a volume between about 100 mL and about 50,000 L. Non-limiting examples include a volume of 100 mL, 250 mL, 500 mL, 750 mL, 1 liter, 2 liters, 3 liters, 4 liters, 5 liters, 6 liters, 7 liters, 8 liters, 9 liters, 10 liters, 15 liters, 20 liters, 25 liters, 30 liters, 40 liters, 50 liters, 60 liters, 70 liters, 80 liters, 90 liters, 100 liters, 150 liters, 200 liters, 250 liters, 300 liters, 350 liters, 400 liters, 450 liters, 500 liters, 550 liters, 600 liters, 650 liters, 700 liters, 750 liters, 800 liters, 850 liters, 900 liters, 950 liters, 1000 liters, 1500 liters, 2000 liters, 2500 liters, 3000 liters, 3500 liters, 4000 liters, 4500 liters, 5000 liters, 6000 liters, 7000 liters, 8000 liters, 9000 liters, 10,000 liters, 15,000 liters, 20,000 liters, and/or 50,000 liters. Additionally, suitable reactors can be multi-use, single-use, disposable, or non-disposable and can be formed of any suitable material including metal alloys such as stainless steel (e.g., 316L or any other suitable stainless steel) and Inconel, plastics, and/or glass. In other embodiments, the bioreactor is an in vitro fertilization chamber, incubator or culture plate/apparatus.

Figure 1:
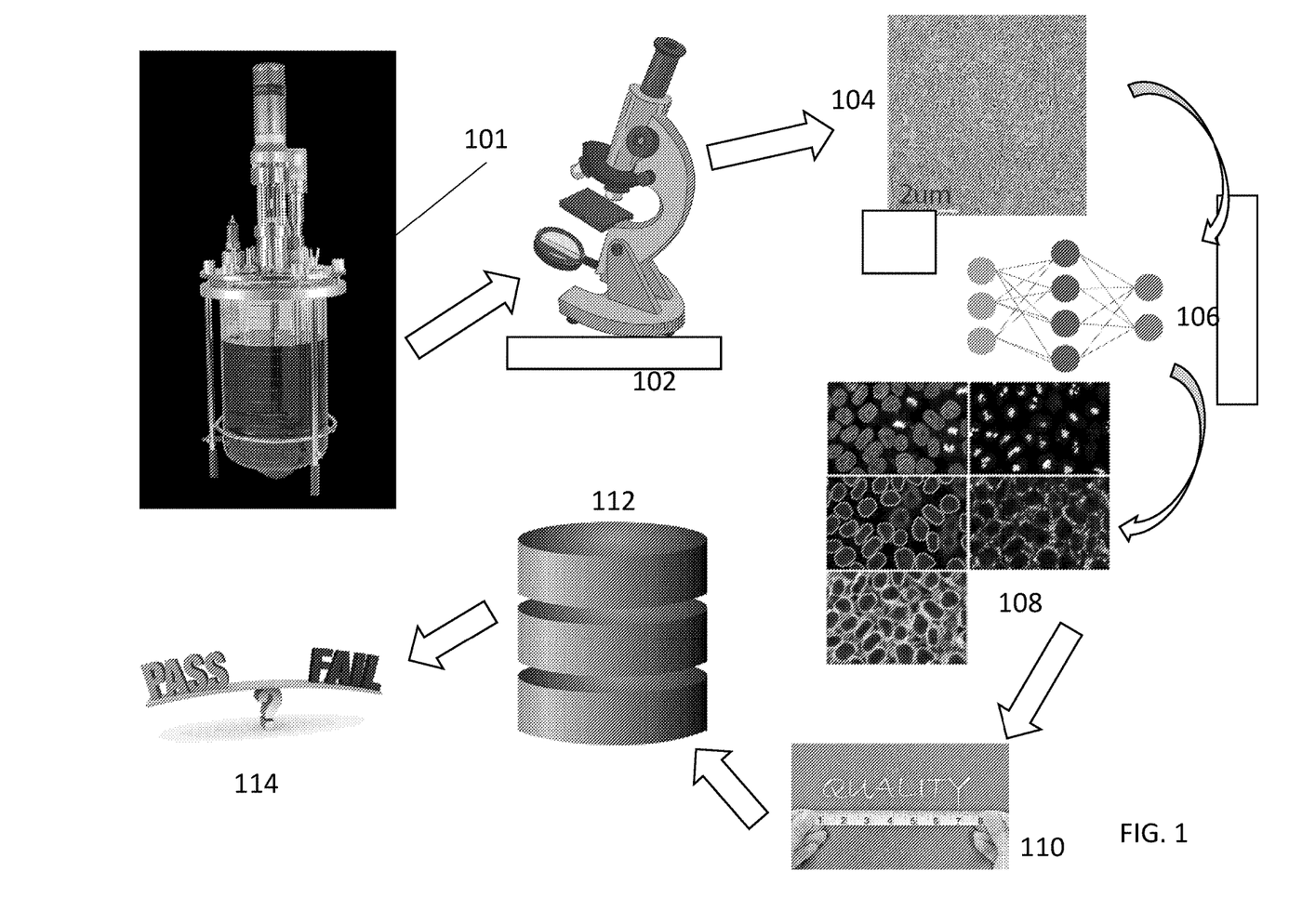
FIG. 1 shows a schematic overview of methods for assessing cell quality as described herein.

As illustrated schematically in FIG. 1, the methods for assessing cell quality during a cellular production process suitably include obtaining a 3D microscopy image 102 that is a transmitted light image of one or more structures of a cell 104 during the cellular production process. It should be understood that the images and schematics shown in FIG. 1 are for representative purposes only and to facilitate a discussion of the methods and systems described herein, and should not be considered limiting structures. In suitable embodiments, the 3D microscopy image 104 does not contain or include any fluorescence labeling of a cell or a structure of a cell (e.g., cell membrane or organelle), and thus is suitably a bright-field image of the structures of the cell and/or the cell itself. As described herein, the ability to obtain a bright-field image (or other type of image) of a cell or cell structure, and obtain from that image information about the quality of a cell in a cell production process, without the need for fluorescence labeling, allows for the use of the methods described herein in a significant number of potential applications without the risk of contaminating or changing a cellular production process. In addition, the ability to exclude the use of fluorescence labeling to track cellular quality allows for the methods described herein to be used with cellular products that are ultimately for use in a human therapeutic application, including for example CAR T-cells, transduced red blood cells or stem cells, fertilized zygotes and fertilized embryos (suitably human). Transduced red blood cells or stem cells are suitably used for treatment of diseases, including for example sickle cell anemia, and suitably express an anti-sickling HBB variant. Determination of a properly transduced or transfected (and viable) red blood cell or stem cell is suitably made prior to implanting back into a patient for treatment of a disease, such as sickle cell anemia.

Additional imaging modalities can also be used to produce or obtain the initial 3D microscopy image 102. For example, darkfield microscopy can be used, as well as differential interference contrast (DIC) microscopy, electromagnetic microscopy, confocal laser scanning microscopy, as well as predicted confocal laser scanning microscopy.

Exemplary structures of a cell that can be imaged via 3D microscopy include, but are not limited to, the entire cell, a cell membrane, a plasma membrane, a nucleus, a pronucleus (pair of gametic nuclei, in the stage following meiosis but before their fusion leads to the formation of the nucleus of a zygote), a nuclear fragment, a mitochondrion, a microtubule, an endoplasmic reticulum, a vacuole, an endosome, an autophagosome, a Golgi Apparatus, a membrane protein, a plasma membrane bleb, or a lysosome. Additional cellular structures known in the art can also be imaged via 3D microscopy. While the methods described herein can be carried out utilizing an image of a single structure (e.g., only images of cell membranes), suitably multiple different structures are imaged to form a set of images that ultimately form a descriptive image set or descriptive image portfolio for a cell (including a specific cell type). In embodiments where embryos are graded, morphology parameters such as, for example, blastocyst expansion, cell abundance, conformity in innercell mass (ICM), trophectoderm (TE) and/or zona pellucida (ZP), are suitably determined. The determination of an appropriately fertilized, and viable, embryo is suitably made prior to determining if an embryo should be implanted into a female for the remainder of the pregnancy, frozen and stored for later implantation.

In embodiments, the transmitted light image of a structure of a cell is obtained prior to a transduction or transfection step of the cellular production process. That is, the cells are imaged before one or more nucleic acid constructs (e.g., DNA, RNA, siRNA, miRNA) are inserted or placed into the cells, and thus the cells have not yet been modified with a desired genetic plasmid, virus, vector or other structure which may either transiently (i.e., not integrated into the genome), or genomically modify the cell. In such embodiments, it may be desirable to determine if a cell is suitable for genetic modification, or if the cells are not yet in a desired state (either too early or cell numbers are too low, etc.) or if the cells may be compromised and are not good candidates for genetic modification (e.g., high cell mortality, contamination, etc.).

In further embodiments, the transmitted light image of the cell structure can be obtained following a transduction or transfection step of the cellular production process, that is after the cell has been modified with a nucleic acid construct. In such embodiments, it may be desirable to confirm that the cells survived the genetic modification. For example, if a transfection protocol such as an electroporation or the use of a lipid or polymer-based transfection carrier was toxic to the cells, or modified some other characteristic of the cells.

In additional embodiments, the transmitted light image of the structure of the cell is obtained following an expansion step of the cellular production process. Thus, the cells can be examined following a period of growth to confirm that the cells are still viable, are healthy and capable of expansion, and potentially determining if the cells express a desired marker or contain the desired construct appropriately. For example, imaging of cellular surface proteins may be able to confirm if a cell is expressing a desired protein, or examining an internal structure of a cell may confirm that a genetic construct was appropriately integrated.

The transmitted light image can also be obtained following a selection step of the cellular production process. For example, a cell can be selected based on the production of a certain protein, or the cell can be selected based upon a column filtration technique, centrifugation, etc. Following this selection, the transmitted light image can be obtained to confirm that the cells are still viable, that they have produced the correct surface protein, or that they include another desired characteristic.

In further embodiments, the transmitted light image can be obtained following an in vitro fertilization step. In such embodiments, an egg (suitably one or more eggs) is combined with sperm to initiate the process of natural fertilization using co-incubation. The process can also be facilitated with direct insertion of sperm into an egg, either manually (injection) or using one more chemical or physical methods (shaking, electrical stimulation, etc.).

As described herein, suitably the methods of assessing cell quality are carried out in real-time. Thus, the transmitted light image (or other type of image described herein) of the structures of the cell is obtained in real-time, suitably as the cellular production process is going on, without the need for a delay due to removal of a sample or transferring a sample to a separate imaging apparatus (e.g., via tubing apparatus, etc.). Suitably, the imaging apparatus for obtaining the transmitted light image is directly coupled to the bioreactor such that cells are imaged during one or more of the timelines outlined herein that occur during the production process. The transmitted light images can be taken as the cells are stationary (e.g., adhering to a cell culture surface), or can be flowing within a tube or other suitable viewing area to allow for the transmitted light image to be obtained.

The methods described herein suitably obtain the transmitted light image (or via other image modality) of the structures of the cell without removal from the cellular production process. Thus, not only are the methods described herein obtained in real-time, but they are obtained in such a manner that the cellular production process is not disturbed, and the cells are not contacted or manipulated, reducing the possibility of introducing contamination or operational artifacts into the cellular production process. The ability to carry out the methods described herein without removing the cell(s) from the cellular production process also allow for the cell production process to maintain a constant (or near constant) volume and appropriate number of cells, and limit the destructive impact that a change in volume or number of cells would have on the overall process.

From the 3D microscopy image, a predicted 3D fluorescence image 108 that includes predicted fluorescence labeling of the one or more structures of the cell is generated, with a neural network 106. Methods for generating a predicted a 3D fluorescence image based on the 3D microscopy image (e.g., a brightfield image) are disclosed in detail in U.S. Published Patent Application No. 2019/0384047, "Systems, Devices, and Methods for Image Processing to Generate an Imaging Having Predictive Tagging," the disclosure of which is incorporated by reference here in its entirety, including the methods for generating a predicted 3D fluorescence image.

Following and based on the generated predicted 3D fluorescence image, the quality attribute 110 of the cell is identified. As described herein, identification of the quality attribute can be related to the structure of the cell, including its internal organelles and components, as well as cellular shape, morphology, cell density/confluency, etc. In embodiments, the quality attribute is one or more of an average or median cell size, a cell viability, a cell confluency, a cell count, a cell morphology, a cell cycle phase, a cell growth rate, a cell integrity, a membrane integrity, an organelle integrity, a mitochondrial activation level, the presence or absence of a mycoplasmal, bacterial, fungal or viral contaminant (e.g., a bacterial, fungal or viral infection of the cell), a fertilization event (i.e., the presence of two pronuclei), a differentiation state, a batch to batch variability, or a quantity of transgenic protein produced. Cell viability refers to the ability of a cell to expand and divide according to its normal, natural processes. Cell confluency refers to the spacing or touching between cells on an adherent growth surface (e.g., flask or culture plate surface, etc.) or in a 3D growth matrix (e.g., microporous beads). Cell morphology refers to the shape of a cell. Cell count refers to the number of cells per volume or per area. The presence of absence of a mycoplasmal, bacterial, fungal or viral contaminant may be determined by the impact that such an infective agent has on a cell structure such the nucleus, cell membrane, a cell organelle, etc. In further embodiments, the presence or absence, or probably of the presence or absence, of a protein biomarker on the surface of a cell can be identified as a quality attribute.

Once a quality attribute of a cell is identified, the quality attribute is assessed against a comparison set 112 for the cell as a measure of cell quality 114. As used herein, a "comparison set" refers to a collection of data (e.g., a database) that has been specifically prepared for use in assessing the quality attribute of the cell, and includes information about each of the quality attributes for one or more cellular types. For example, a comparison set can be generated that includes information about a plurality of quality attributes for a cell type such as a mammalian cells, including a human cell, and in particular cells for use in cell therapies or research such as Chimeric Antigen Receptor (CAR) T-cells, Chinese Hamster Ovary (CHO) cells, HeLa cells, Jurkat T-cells, Human Embryonic Kidney (HEK) cells, fertilized zygotes (including human), fertilized embryos (including human), red blood cells, or stem cells. Suitably, comparison sets are prepared for each individual cell type and can be provided and distributed to an end user either as individual databases for each cell type, or can be provided as a combination of various cell types depending on the end users application. The comparison sets can be updated regularly either via an update provided to a computer system, or automatically via wireless downloads and periodic updates. In embodiments, a comparison set is prepared and then not modified during a quality assessment process. In other embodiments, a comparison set can be automatically or manually updated with new data to further refine or expand the comparison set for a particular cell, class of cells, or multiple cell types, allowing for continued use of the methods and devices described herein with changing cell characteristics or desired cellular outcomes.

The determination of cell quality 114 is a variable that can be modified from one cell type to another, and can also be scored and analyzed individually for each quality attribute that is determined for a cell. For example, cell quality 114 based on cell viability may be a binary determination, i.e., the cell is alive (1) or dead (0), whereas cell quality 114 based on cell confluency may be a graded scale, where some confluency is desired or even required, but cells touching on all sides may be undesirable. In addition, other quality attributes may also have graded scales, such as the cell count, where a desired number of cells of greater than $1e^6$ cells is highly desirable, but $1e^5$ cells may also be acceptable to continue the cell production process, depending on the stage of the process.

The determination of cell quality 114 can also be quantitative. For example, the determination of the quality attribute may provide information that can be used to provide a probability score or determination for a cell quality. In exemplary embodiments, quantitative determinations can include the probably that a cell population (or percentage of a cell population) is apoptotic (e.g., 80% probably that 30% of the cells are apoptotic), the probably that a cell population is in a particular cell phase (e.g., 70% probably that 20% of the cells are in S phase), or the probably that a certain percentage of cells are infected with a microbial or viral contamination (e.g., 90% probably that about 1% of the cells are contaminated), etc.

The predictive fluorescence labeling described herein and applied to 3D images, is especially useful for structures smaller than the cellular level. Such structures, such as cell membranes, nucleus, and organelles, may be referred to as sub-cellular or intracellular structures. The 3D images may, for instance, be more suitable for training and yield a model that reflects a more accurate relationship between two imaging modalities. However, applying the predictive labeling to 3D images may be especially challenging because the 3D images may consume much more memory space relative to 2D images.

In some instances, inexpensive, commodity computing hardware such as desktops, laptops, or a graphics processing unit (GPU) cluster may have a limited amount of main memory (e.g., dynamic RAM (DRAM)) that cannot accommodate all of the 3D images at the same time, and thus may be constrained in its ability to train a statistical model with the 3D images. In such embodiments, the technical solution may involve storing the 3D images in secondary memory, such as a hard disk drive (HDD), and loading only a portion of the 3D images into the main memory at a time. The technical solution may further divide the training of the statistical model over several iterations. During each iteration, the computing platform may load a new portion of the 3D images from the secondary memory into main memory, and update the statistical model with the new portion of the 3D images. In some cases, the technical solution may involve downsampling the 3D images before they are used in training the statistical model. Thus, the solutions described herein overcome the particular and significant technical challenges involved in implementing predictive labeling for 3D images. While a convolutional neural network is suitably utilized in the methods described herein, other types of statistical models, including deterministic or stochastic models, may be used.

As described herein, the methods of assessing cell quality combine the benefits of detecting or visualizing specific cellular structures (which can include: intracellular structures, molecules, and foreign bodies, and super-cellular structures, for example groups of cells, networks of cells, regions of living tissue) with the ease and non-invasive nature of, e.g., bright-field imaging or other transmitted light imaging, and the ability to monitor cell quality in real-time during a cellular production process. As described in U.S. Published Patent Application No. 2019/0384047, the predictive localization of cellular structures can be visualized by training statistical models using fluorescence images of one or more labeled structures of interest, (e.g., as a first set of 3D images of a plurality of sets of 3D images), to predict the labeling of those structures in three dimensional microscopy images without any structural labeling (e.g., as a second set of 3D images).

Figure 2:
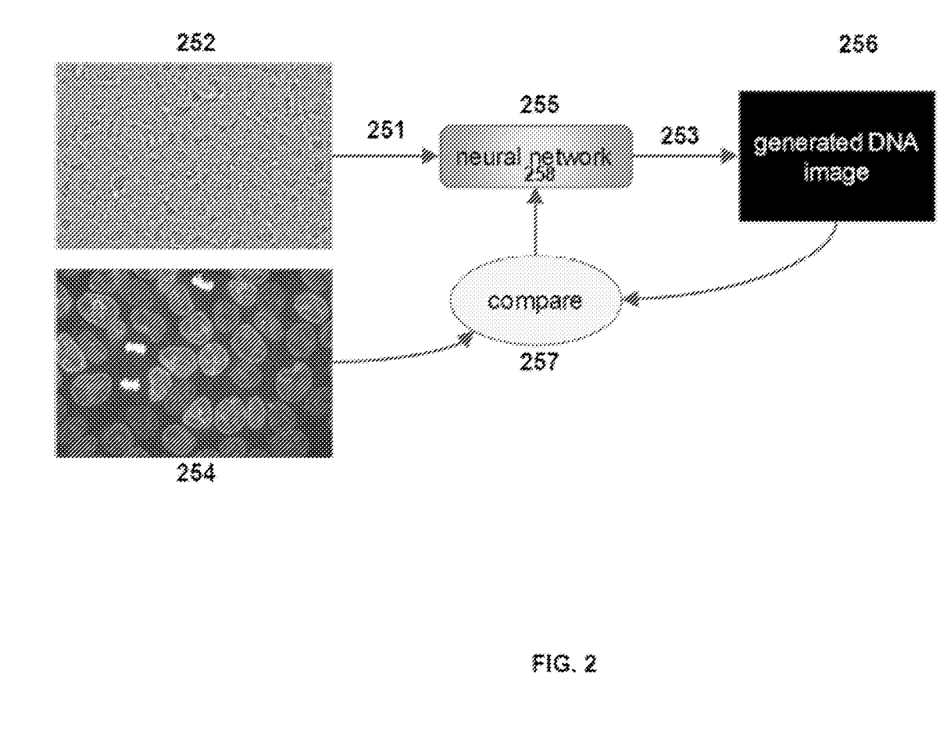
FIG. 2 shows a system for generating and iteratively training a statistical model, for use in embodiments hereof.

FIG. 2 illustrates an example of a system for generating and iteratively training a statistical model, which can also be referred to more generally as a model, for visualizing the localization of cellular structures by predicting or otherwise identifying the location of tags, dyes, and other labels for those cellular structures, as described in U.S. Published Patent Application No. 2019/0384047. As described herein, such processes are utilized in the methods for assessing cell quality as described herein during the generation of a predicted 3D image. In the example of FIG. 2, the cellular structures can be DNA structures within a cell, but this can be extended to other structures described herein. More particularly, FIG. 2 illustrates some of the steps involved in each iteration of training the statistical model, to optimize the parameters of the statistical model for the predictive localization of the DNA structure within cells. For instance, a processor can be configured to retrieve a transmitted light image 252 of a cell culture, including cells of a cellular production process. The transmitted light image 252 can be considered an unlabeled image. The processor can be configured to generate a statistical model, such as a neural network 258, using the unlabeled image 252 and a labeled image 254 of cells. Image 254 and image 252 are of the same section of cells. Image 254 can be a fluorescent image (also referred to as a fluorescence image) of that same section of the cells, wherein the DNA structure is labelled with a fluorescent Hoechst dye that binds to DNA material as an example, although other labels (e.g. dyes, and/or tags) could be used. In an embodiment, the image 252 and the image 254 may be brought into alignment with each other before being used to train the neural network 258.

At step 251, the processor can generate and train the neural network 258 or other statistical model to learn the association between the unlabeled image 252 and the labeled image 254. At step 255, the processor can use the trained neural network 258 to apply the trained statistical model on the unlabeled image 252 to generate, at step 253, a predicted labeling indicated by generated image 256. For instance, the predicted labeling can predict or otherwise estimate which portions of the unlabeled image 252 of a cell sample would have a particular dye color if the image 252 had instead been obtained by performing fluorescence imaging on the same sample. This prediction can be used to generate a predicted (e.g., approximate or estimated) fluorescence image of the cells from an unlabeled image, and can then be utilized in the methods of assessing cell quality as described herein.

Suitably, the systems, devices, and methods disclosed herein utilize deep learning (deep structural learning, hierarchical learning, machine learning, and architecture) to predict the localization of cells or specific cellular structures from three dimensional bright-field microscopy images or other transmitted light images collected during a cellular production process. The disclosed systems, devices, and methods serve to transfer information (e.g., object or structure specific labeling) contained in a three dimensional stack of imaging data, in one imaging modality, to another imaging modality, thereby allowing using of the advantageous properties of both imaging modalities. The disclosed systems and methods can be characterized by quantifying the relationship between image stacks in each imaging modality. For example, an implementation of predictive localization of sub-cellular structures can be characterized by quantifying image information about specific structures predicted from transmitted light images and from the localization of dye and nuclei labelled with Green Fluorescent Protein (GFP). This predictive localization is then used to identify a quality attribute of the cell as described herein.

The quality attribute of the cell is then assessed against a comparison set as described herein. Data to compose the comparison set can be stored on a hard disk drive (HDD), a solid state drive (SDD), a tape drive, DRAM, any other form of memory, or any combination thereof. In some cases, the comparison set is, or can be, or can implement a database. The data for the comparison set can also be stored remotely, and the methods described herein access the data via a wireless or internet connection, etc.

As described herein, the methods of assessing cell quality suitably utilize a neural network to generate predictive fluorescence labeling. The predictive methods may be performed by a processor of a computing device executing computer-executable instructions stored in a non-transitory computer-readable medium, such as the processor executing instructions stored in the non-transitory computer readable medium. The predictive methods may focus on three-dimensional (3D) images of cellular structures. The cellular structures may include cell components and other structures smaller than the cell level, such as cell membranes, nucleus, pronuclei, a nuclear fragment, and cell organelles (e.g., mitochondrion, endoplasmic reticulum, vacuole, Golgi Apparatus, an autophagosome, a plasma membrane bleb, or a lysosome). In some instances, the use of 3D images may be advantageous, because they may contain image data along an additional dimension (relative to 2D images), and thus may provide more image data for training the neural network described herein. However, the use of 3D images may involve additional processing that deals with the significantly larger memory size of such 3D images.

In an embodiment, the predictive methods include a step, in which the processor receives a first set of three-dimensional (3D) microscopy images and a second set of 3D microscopy images. In an embodiment, the first set of 3D microscopy images and the second set of 3D microscopy images are received via a communication interface, such as an I/O unit, from an image storage device or directly from an image sensor of a microscope.

In an embodiment, the first set of 3D microscopy images may be 3D fluorescence images of a plurality of cellular structures in a plurality of cell samples, and the second set of 3D microscopy images are 3D transmitted light images of cellular structures, wherein no fluorescence labeling is included in the second set of 3D microscopy images, and the light images are from a cellular production process, suitably taken in real time.

In an embodiment, the first set of 3D microscopy images may include a single fluorescence channel, wherein each channel may correspond to a particular fluorescence marker or its emission spectrum. For instance, such a set of 3D microscopy images may include color (or, more generally, contrast information) from only green fluorescence protein (GFP), or from only a frequency filter band corresponding to the emission spectrum of GFP. Such 3D microscopy images may thus display or otherwise include only those sub-cellular structures in a particular tissue sample that are tagged by GFP. In an embodiment, the first set of 3D microscopy images may include multiple fluorescence channels.

In an embodiment, the second set of 3D microscopy images may have been captured with transmitted light using, e.g., Kohler illumination. In an embodiment, each of the second set of 3D microscopy images is at least one of a brightfield image, a darkfield image, or a differential interference contrast (DIC) image. In an embodiment, cellular structures to which the predictive imaging methods are applied may include structures (e.g., mitochondrion) having a lipid envelope, which may exhibit a different refractive index than its surrounding. The second set of 3D microscopy images do not include any fluorescence labeling.

Figure 3:
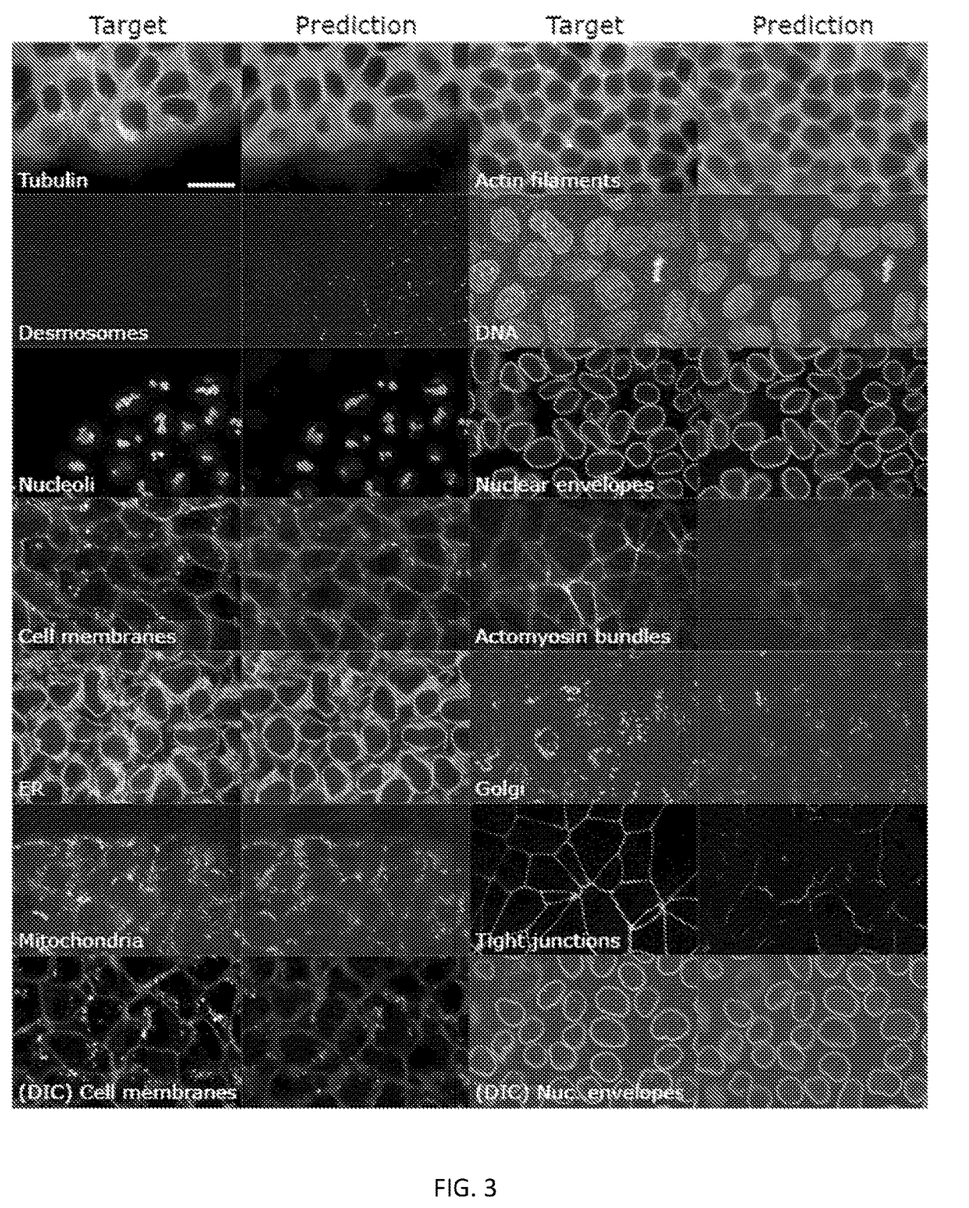
FIG. 3 shows exemplary predictive 3D fluorescence imaging in accordance with embodiments hereof.

FIG. 3 shows a comparison of true fluorescence labeled images to predicted fluorescence images. More specifically, the figure shows additional labeled structure models and predictions for 3D light microscopy. For each model, a single z-slice of a ground-truth (observed) fluorescence image is shown beside an image predicted by a labeled structure model, given the corresponding 3D transmitted light image as input (latter not shown). All models use bright-field images as inputs except for models shown in the last row, which were trained on DIC images. Z-slices were chosen in a curated fashion to highlight the structure of interest associated with each model. Image-slice pairs were identically contrast stretched, such that black and white values corresponded to the 0.1 and 99.9th percentiles of the target image intensity, respectively. All images shown are independent from model training data. The scale bar is 20 micron.

In embodiments, the methods for assessing cell quality during a cellular production process, include: obtaining a 3D microscopy image that is a transmitted light image (or other type of 3D microscopy image described herein) of one or more structures of a cell in real-time during the cellular production process, wherein no fluorescence labeling is included in the 3D microscopy image, and wherein the cell is not removed from the cellular production process during the obtaining of the 3D microscopy image; generating, with a neural network, a predicted 3D fluorescence image that includes predicted fluorescence labeling of the one or more structures of the cell; identifying a quality attribute of the cell based on the predicted 3D fluorescence images cell, wherein the quality attribute is one or more of an average or median cell size, a cell viability, a cell confluency, a cell count, a cell morphology, a cell cycle phase, a cell growth rate, a cell integrity, a membrane integrity, an organelle integrity, a mitochondrial activation level, the presence or absence of a mycoplasmal, bacterial, fungal or viral contaminant, a fertilization event, a differentiation state, a batch to batch variability, or a quantity of transgenic protein produced; and assessing the quality attribute against a comparison set for the cell as a measure of cell quality.

As described herein, the one or more structures of the cell suitably include at least one of a cell membrane, a plasma membrane, a nucleus, a mitochondrion, a nuclear fragment, an autophagosome, a plasma membrane bleb, a microtubule, an endoplasmic reticulum, a vacuole, an endosome, a Golgi Apparatus, a membrane protein, or a lysosome.

In exemplary embodiments, the cellular production process is an automated process, and suitably the transmitted light image is obtained in real time and without removing the cell or disrupting the cell during the cellular production process.

The transmitted light image can be obtained prior to a transduction or transfection step of the cellular production process, following a transduction or transfection step of the cellular production process, following an expansion step of the cellular production process, and/or following a selection step of the cellular production process, including any combination of these steps during the production process.

As described herein, the cellular production process suitably produces any type of mammalian, bacterial or yeast cell. In suitable embodiments, the cellular production process produces a mammalian cell, including a human cell. Exemplary types of cells that can be produced in the cellular production process include cells such as chimeric antigen receptor (CAR) T-cells, Chinese Hamster Ovary (CHO) cells, HeLa cells, Jurkat T cells, Human Embryonic Kidney (HEK) cells, fertilized zygotes, fertilized embryos, red blood cells, or stem cells.

In further embodiments, provided herein are systems 400 for assessing cell quality during a cellular production process. A schematic illustrating the components of system 400 is provided in FIG. 4. The scale and arrangement of the components of system 400 are provided for illustrative purposes only, and should not be construed as limiting.

Figure 4:
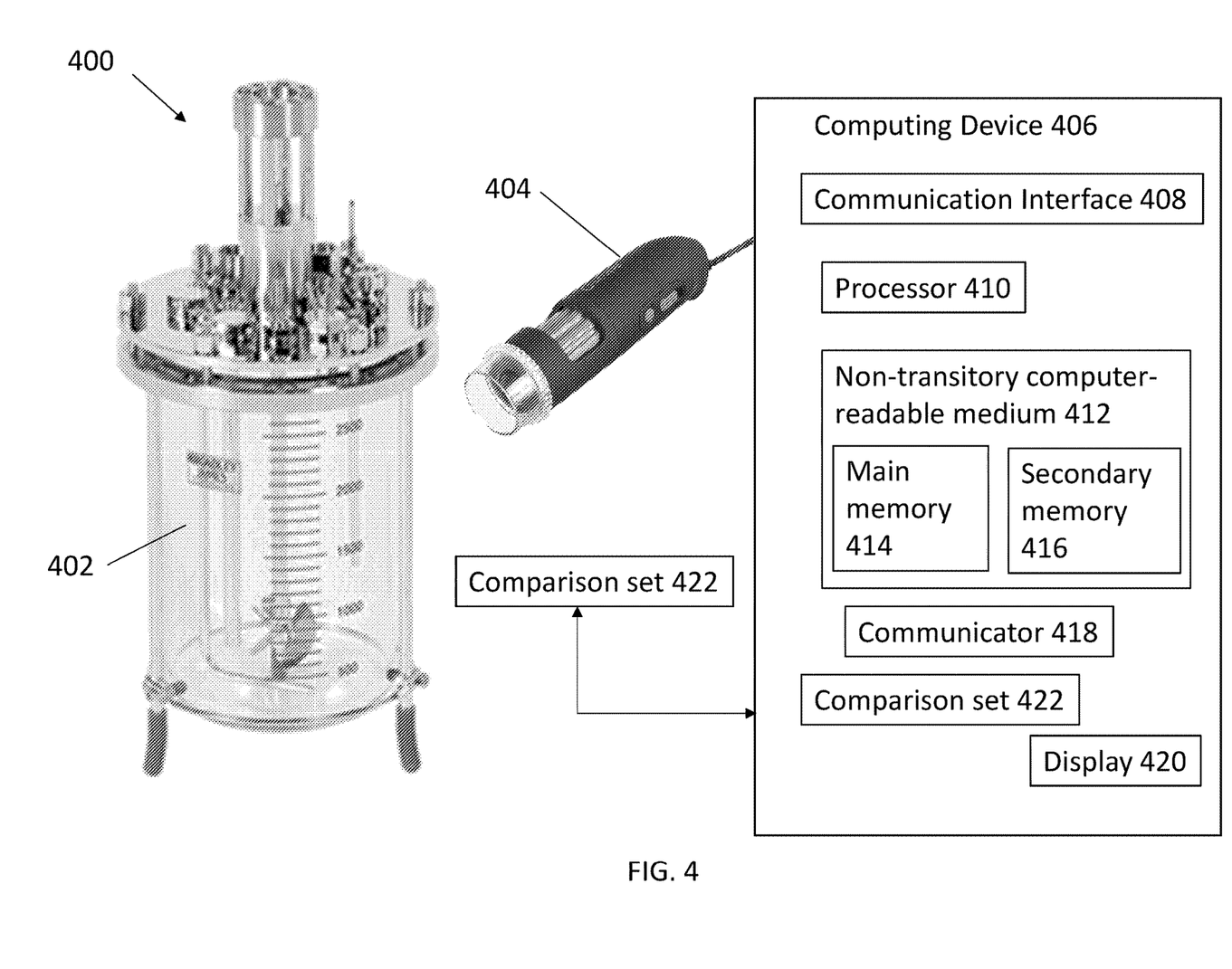
FIG. 4 shows a system for assessing cell quality, in accordance with embodiments hereof.

In embodiments, system 400 includes a bioreactor 402 for carrying out a cellular production process. Exemplary bioreactors 402, including sizes and characteristics, are described herein. System 400 further includes a microscope 404 configured to obtain a 3D microscopy, transmitted light image of a structure of a cell in the bioreactor (or other 3D microscopy image source, such as darkfield microscopy, DIC microscopy, electron microscopy, confocal laser scanning microscopy (CLSM) or predicted CLSM. Microscope 404 can include a camera interface, including a fiber optic or other suitable interface, for connecting to bioreactor 402, or microscope 404 can simply be directly connected to bioreactor 402 (or within a suitable distance from the bioreactor) to be able to obtain a 3D microscopy, transmitted light image of a structure of a cell. Suitably, microscopy 404 is directly coupled or connected to bioreactor 402 such that it is integrated into the bioreactor.

System 400 suitably further includes a computing device 406 that includes a communication interface 408 configured to receive the 3D microscopy, transmitted light image. Communication interface 408 can be directly connected to microscope 404 via a wired connection, or can be wirelessly connected, for example via Bluetooth connection, or can be networked together via internet connection, etc.

Computing device 406 further includes a processor 410, and a non-transitory computer-readable medium 412 communicatively coupled to the communication interface and to the processor, and storing computer-executable instructions that, when executed by the processor, causes the processor to: generate, with a neural network, a predicted 3D fluorescence image that includes predicted fluorescence labeling of the one or more structures of the cell, including sub-cellular structures. Non-transitory computer-readable medium 412 suitably further includes, stored computer-executable instructions that, when executed by the processor, identify a quality attribute of the cell based on the predicted 3D fluorescence image, and assess the quality attribute against a comparison set 422 for the cell as a measure of cell quality. Comparison set 422 is suitably included in computing device 406, but can also be housed on an external computing device, for example a remote database that can be access via internet connection or wireless (e.g., Bluetooth) connection. Computing device 406 also suitably further includes a communicator 418 for example, for communicating with external comparison set 422, or for communicating with an additional computing device that is monitoring the systems and methods described herein. Computing device 406 also suitably further includes a display 420, for example a screen output, that can be used to show the results of the predictive imaging, the identification of the quality attribute, and/or the measurement of the cell quality as a visual or quantitative output. Exemplary visual and/or quantitative outputs of cell quality can include, for example, numeric or graphical displays of cell viability, cell integrity, cell confluency measurements, designations of cell cycle, number of cells, percentage of live cells, percentage of likelihood of microbial contamination, density or number of surface protein biomarkers, etc.

As described herein, bioreactor 402 that can be utilized in the cellular production process can be any suitable size, and can be any suitable type, including for example a feed-batch bioreactor, a perfusion bioreactor, etc. As described herein, suitably bioreactor 402 is an automated bioreactor, in that it requires little to no user input once the bioreactor is started. In other embodiments, bioreactor 402 is an in vitro fertilization chamber. Similarly, systems 400 described herein for assessing cell quality can also be automated, in that once they are initiated, the cellular production process can be monitored continuously, randomly, or at a set periodic time, or set to coincide with a particular stage of the cellular production process to provide real-time information regarding the cell quality before, during, or after the cell production process.

As described herein, microscope 404 is suitably configured to obtain the 3D microscopy, transmitted light image without removal of the cell from the bioreactor, thus allowing for real-time imaging, without disturbing the cellular production process and thereby limiting contamination and disruption of the process

EXAMPLES

Example 1: Assessing Cell Quality of a CAR-T Production Process

Peripheral blood mononuclear cells (PBMC) are prepared at a density of $1\text{-}3\times10^6$ cells/mL, and allowed to expand. On Day 0, $50\text{-}40\times10^6$ PBMC are loaded/inoculated into a 3 L bioreactor using a suitable media. Cells are transduced with a suitable vector or plasmid system, containing the desired chimeric antigen receptor (CAR). T Cells are activated using beads or other suitable mechanisms. Cells are allowed to expand in the bioreactor for a period of about 6-8 days. Following expansion, the cells are harvested, filter and concentrated if desired.

During the production process, a microscope camera coupled to the bioreactor obtains images of the cells, including cellular structures, and generates a 3D transmitted light image utilizing a computing device. A predicted 3D fluorescence image of the cellular structures is generated using a neural network. Images are obtained at the following points in the cellular production process: following inoculation; following transduction; prior to activation; following activation; during expansion; and/or prior to harvesting.

The following quality attributes of the cells are identified and assessed at one or more of an average or median cell size, a cell viability, a cell confluency, a cell count, a cell morphology, a cell cycle phase, a cell growth rate, a cell integrity, a membrane integrity, an organelle integrity, a mitochondrial activation level, the presence or absence of a mycoplasmal, bacterial, fungal or viral contaminant, a differentiation state, a batch to batch variability, or a quantity of transgenic protein produced. Assessing the quality attributes includes the use of a comparison set of data for CAR-T cells that includes information on appropriate or desired levels or measures of one or more of an average or median cell size, a cell viability, a cell confluency, a cell count, a cell morphology, a cell cycle phase, a cell growth rate, a cell integrity, a membrane integrity, an organelle integrity, a mitochondrial activation level, the presence or absence of a mycoplasmal, bacterial, fungal or viral contaminant, a differentiation state, a batch to batch variability, or a quantity of transgenic protein produced.

The results of the cell quality assessment indicate that the cells are 70-90% viable, less than 0.1% indicate the presence of a microbial contamination, and greater than 80% have the desired morphology.

Additional Discussion of Various Embodiments

Embodiment 1 is a method for assessing cell quality during a cellular production process, the method comprising: obtaining a 3D microscopy image that is a transmitted light image of one or more structures of a cell during the cellular production process, wherein no fluorescence labeling is included in the 3D microscopy image; generating, with a neural network, a predicted 3D fluorescence image that includes predicted fluorescence labeling of the one or more structures of the cell; identifying a quality attribute of the cell based on the predicted 3D fluorescence image; and assessing the quality attribute against a comparison set for the cell as a measure of cell quality.

Embodiment 2 includes the method of embodiment 1, wherein the transmitted light image of the structures of the cell is obtained in real-time during the cellular production process.

Embodiment 3 includes the method of embodiment 1 or 2, wherein the transmitted light image of the structures of the cell is obtained without removing the cell from the cellular production process.

Embodiment 4 includes the method of any of embodiments 1-3, wherein the one or more structures include at least one of a cell membrane, a plasma membrane, a nucleus, a pronucleus, a nuclear fragment, a mitochondrion, a microtubule, an endoplasmic reticulum, a vacuole, an endosome, an autophagosome, a Golgi Apparatus, a membrane protein, a plasma membrane bleb, or a lysosome.

Embodiment 5 includes the method of any of embodiments 1-4, wherein the cellular production process is an automated process.

Embodiment 6 includes the method of any of embodiments 1-5, wherein the transmitted light image is obtained prior to a transduction or a transfection step of the cellular production process.

Embodiment 7 includes the method of any of embodiments 1-5, wherein the transmitted light image is obtained following a transduction or a transfection step of the cellular production process.

Embodiment 8 includes the method of any of embodiments 1-5, wherein the transmitted light image is obtained following an expansion step of the cellular production process.

Embodiment 9 includes the method of any of embodiments 1-5, wherein the transmitted light image is obtained following a selection step of the cellular production process.

Embodiment 10 includes the method of any one of embodiments 1-5, wherein the transmitted light image is obtained following an in vitro fertilization step.

Embodiment 11 includes the method of any of embodiments 1-10, wherein the quality attribute is one or more of an average or median cell size, a cell viability, a cell confluency, a cell count, a cell morphology, a cell cycle phase, a cell growth rate, a cell integrity, a membrane integrity, an organelle integrity, a mitochondrial activation level, the presence or absence of a mycoplasmal, bacterial, fungal or viral contaminant, a fertilization event, a differentiation state, a batch to batch variability, or a quantity of transgenic protein produced.

Embodiment 12 includes the method of any of embodiments 1-11, wherein the cellular production process produces Chimeric Antigen Receptor (CAR) T-cells, Chinese Hamster Ovary (CHO) cells, Human Embryonic Kidney (HEK) cells, HeLa cells, Jurkat T-cells, fertilized zygotes, fertilized embryos, red blood cells, or stem cells.

Embodiment 13 is a method for assessing cell quality during a cellular production process, the method comprising: obtaining a 3D microscopy image that is a transmitted light image of one or more structures of a cell in real-time during the cellular production process, wherein no fluorescence labeling is included in the 3D microscopy image, and wherein the cell is not removed from the cellular production process during the obtaining of the 3D microscopy image; generating, with a neural network, a predicted 3D fluorescence image that includes predicted fluorescence labeling of the one or more structures of the cell; identifying a quality attribute of the cell based on the predicted 3D fluorescence images, wherein the quality attribute is one or more of an average or median cell size, a cell viability, a cell confluency, a cell count, a cell morphology, a cell cycle phase, a cell growth rate, a cell integrity, a membrane integrity, an organelle integrity, a mitochondrial activation level, the presence or absence of a mycoplasmal, bacterial, fungal or viral contaminant, a fertilization event, a differentiation state, a batch to batch variability, or a quantity of transgenic protein produced; and assessing the quality attribute against a comparison set for the cell as a measure of cell quality.

Embodiment 14 includes the method of embodiment 13, wherein the one or more structures include at least one of a cell membrane, a plasma membrane, a nucleus, a pronucleus, a nuclear fragment, a mitochondrion, a microtubule, an endoplasmic reticulum, a vacuole, an endosome, an autophagosome, a Golgi Apparatus, a membrane protein, a plasma membrane bleb, or a lysosome.

Embodiment 15 includes the method of embodiment 13 or 14, wherein the cellular production process is an automated process.

Embodiment 16 includes the method of any of embodiments 13-15, wherein the transmitted light image is obtained prior to a transduction or a transfection step of the cellular production process.

Embodiment 17 includes the method of any of embodiments 13-15, wherein the transmitted light image is obtained following a transduction or a transfection step of the cellular production process.

Embodiment 18 includes the method of any of embodiments 13-15, wherein the transmitted light image is obtained following an expansion step of the cellular production process.

Embodiment 19 includes the method of any of embodiments 13-15, wherein the transmitted light image is obtained following a selection step of the cellular production process.

Embodiment 20 includes the method of any one of embodiments 13-15, wherein the transmitted light image is obtained following an in vitro fertilization step.

Embodiment 21 includes the method of any of embodiments 13-20, wherein the cellular production process produces chimeric antigen receptor (CAR) T-cells, Chinese Hamster Ovary (CHO) cells, Human Embryonic Kidney (HEK) cells, HeLa cells, Jurkat T-cells, fertilized zygotes, fertilized embryos, red blood cells, or stem cells.

Embodiment 22 is a system for assessing cell quality during a cellular production process, comprising: a bioreactor for carrying out the cellular production process; a microscope configured to obtain a 3D microscopy, transmitted light image of a structure of a cell in the bioreactor; a communication interface configured to receive the 3D microscopy, transmitted light image; a processor; and a non-transitory computer-readable medium communicatively coupled to the communication interface and to the processor, and storing computer-executable instructions that, when executed by the processor, causes the processor to: generate, with a neural network, a predicted 3D fluorescence image that includes predicted fluorescence labeling of the one or more structures of the cell; identify a quality attribute of the cell based on the predicted 3D fluorescence image; and assess the quality attribute against a comparison set for the cell as a measure of cell quality.

Embodiment 23 includes the system of embodiment 22, wherein the bioreactor is a feed-batch bioreactor.

Embodiment 24 includes the system of embodiment 22, wherein the bioreactor is a perfusion bioreactor.

Embodiment 25 includes the system of any of embodiments 22-24, wherein the bioreactor is an automated bioreactor.

Embodiment 26 includes the system of claim 22, wherein the bioreactor is an in vitro fertilization chamber.

Embodiment 27 includes the system of any of embodiments 22-26, wherein the microscope is configured to obtain the 3D microscopy, transmitted light image without removal of the cell from the bioreactor.

Embodiment 28 includes the system of any of embodiments 22-27, wherein the microscope is directly coupled to the bioreactor.

It is to be understood that while certain embodiments have been illustrated and described herein, the claims are not to be limited to the specific forms or arrangement of parts described and shown. In the specification, there have been disclosed illustrative embodiments and, although specific terms are employed, they are used in a generic and descriptive sense only and not for purposes of limitation. Modifications and variations of the embodiments are possible in light of the above teachings. It is therefore to be understood that the embodiments may be practiced otherwise than as specifically described.

While various embodiments have been described above, it should be understood that they have been presented only as illustrations and examples of the present technology, and not by way of limitation. It will be apparent to persons skilled in the relevant art that various changes in form and detail can be made therein without departing from the spirit and scope of the present technology. Thus, the breadth and scope of the present technology should not be limited by any of the above-described embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. A method for assessing cell quality during a cellular production process, the method comprising:
   a. obtaining a 3D microscopy image that is a transmitted light image of one or more structures of a cell during the cellular production process, wherein no fluorescence labeling is included in the 3D microscopy image;

b. generating, with a neural network, a predicted 3D fluorescence image that includes predicted fluorescence labeling of the one or more structures of the cell;

c. identifying a quality attribute of the cell based on the predicted 3D fluorescence image; and d. assessing the quality attribute against a comparison set for the cell as a measure of cell quality.

2. The method of claim 1, wherein the transmitted light image of the structures of the cell is obtained in real-time during the cellular production process, or in real time during the cellular production process wherein the cell is not removed from the cellular production process.

3. The method of claim 1, wherein the one or more structures include at least one of a cell membrane, a plasma membrane, a nucleus, a pronucleus, a nuclear fragment, a mitochondrion, a microtubule, an endoplasmic reticulum, a vacuole, an endosome, an autophagosome, a Golgi Apparatus, a membrane protein, a plasma membrane bleb, or a lysosome.

4. The method of claim 1, wherein the cellular production process is an automated process.

5. The method of claim 1, wherein the transmitted light image is obtained prior to a transduction or a transfection step of the cellular production process, or following a transduction or transfection step of the cellular production process.

6. The method of claim 1, wherein the transmitted light image is obtained following an expansion step of the cellular production process, a selection step, and/or an in vitro fertilization step.

7. The method of claim 1, wherein the quality attribute is one or more of an average or median cell size, a cell viability, a cell confluency, a cell count, a cell morphology, a cell cycle phase, a cell growth rate, a cell integrity, a membrane integrity, an organelle integrity, a mitochondrial activation level, the presence or absence of a mycoplasmal, bacterial, fungal or viral contaminant, a fertilization event, a differentiation state, a batch to batch variability, or a quantity of transgenic protein produced.

8. The method of claim 1, wherein the cellular production process produces Chimeric Antigen Receptor (CAR) T-cells, Chinese Hamster Ovary (CHO) cells, Human Embryonic Kidney (HEK) cells, HeLa cells, Jurkat T-cells, fertilized zygotes, fertilized embryos, red blood cells, or stem cells.

9. A method for assessing cell quality during a cellular production process, the method comprising:

a. obtaining a 3D microscopy image that is a transmitted light image of one or more structures of a cell in real-time during the cellular production process, wherein no fluorescence labeling is included in the 3D microscopy image, and wherein the cell is not removed from the cellular production process during the obtaining of the 3D microscopy image;

b. generating, with a neural network, a predicted 3D fluorescence image that includes predicted fluorescence labeling of the one or more structures of the cell;

c. identifying a quality attribute of the cell based on the predicted 3D fluorescence images, wherein the quality attribute is one or more of an average or median cell size, a cell viability, a cell confluency, a cell count, a cell morphology, a cell cycle phase, a cell growth rate, a cell integrity, a membrane integrity, an organelle integrity, a mitochondrial activation level, the presence or absence of a mycoplasmal, bacterial, fungal or viral contaminant, a fertilization event, a differentiation state, a batch to batch variability, or a quantity of transgenic protein produced; and d. assessing the quality attribute against a comparison set for the cell as a measure of cell quality.

10. The method of claim 9, wherein the one or more structures include at least one of a cell membrane, a plasma membrane, a nucleus, a pronucleus, a nuclear fragment, a mitochondrion, a microtubule, an endoplasmic reticulum, a vacuole, an endosome, an autophagosome, a Golgi Apparatus, a membrane protein, a plasma membrane bleb, or a lysosome.

11. The method of claim 9, wherein the cellular production process is an automated process.

12. The method of claim 9, wherein the transmitted light image is obtained prior to a transduction or a transfection step of the cellular production process or following a transduction or transfection step of the cellular production process.

13. The method of claim 9, wherein the transmitted light image is obtained following an expansion step of the cellular production process, a selection step, and/or an in vitro fertilization step.

14. The method of claim 9, wherein the cellular production process produces chimeric antigen receptor (CAR) T-cells, Chinese Hamster Ovary (CHO) cells, Human Embryonic Kidney (HEK) cells, HeLa cells, Jurkat T-cells, fertilized zygotes, fertilized embryos, red blood cells, or stem cells.

15. A system for assessing cell quality during a cellular production process, comprising:

a. a bioreactor for carrying out the cellular production process;

b. a microscope configured to obtain a 3D microscopy, transmitted light image of a structure of a cell in the bioreactor;

c. a communication interface configured to receive the 3D microscopy, transmitted light image;

d. a processor; and e. a non-transitory computer-readable medium communicatively coupled to the communication interface and to the processor, and storing computer-executable instructions that, when executed by the processor, causes the processor to:

i. generate, with a neural network, a predicted 3D fluorescence image that includes predicted fluorescence labeling of the one or more structures of the cell;

ii. identify a quality attribute of the cell based on the predicted 3D fluorescence image; and iii. assess the quality attribute against a comparison set for the cell as a measure of cell quality.

16. The system of claim 15, wherein the bioreactor is a feed-batch bioreactor or a perfusion bioreactor.

17. The system of claim 15, wherein the bioreactor is an automated bioreactor.

18. The system of claim 15, wherein the bioreactor is an in vitro fertilization chamber.

19. The system of claim 15, wherein the microscope is configured to obtain the 3D microscopy, transmitted light image without removal of the cell from the bioreactor.

20. The method of claim 15, wherein the microscope is directly coupled to the bioreactor.

* * * * *